(12) United States Patent
Tanaka et al.

(10) Patent No.: US 8,920,150 B2
(45) Date of Patent: Dec. 30, 2014

(54) PIN HAVING LIGHT GUIDE FOR INJECTION MOLD

(71) Applicant: Futaba Corporation, Mobara-shi, Chiba-ken (JP)

(72) Inventors: Toshiharu Tanaka, Mobara (JP); Yasuhiro Nohara, Mobara (JP)

(73) Assignee: Futaba Corporation, Mobari-Shi, Chiba-Ken (JP)

( * ) Notice: Subject to any disclaimer, the term of this patent is extended or adjusted under 35 U.S.C. 154(b) by 0 days.

(21) Appl. No.: 14/108,750

(22) Filed: Dec. 17, 2013

(65) Prior Publication Data

US 2014/0186487 A1      Jul. 3, 2014

(30) Foreign Application Priority Data

Dec. 27, 2012   (JP) ................................. 2012-286376

(51) Int. Cl.
*B29C 45/77*     (2006.01)
*B29C 45/40*     (2006.01)

(52) U.S. Cl.
CPC ..... *B29C 45/401* (2013.01); *B29C 2945/76006* (2013.01); *B29C 2945/7604* (2013.01); *B29C 2945/7611* (2013.01); *B29C 2945/76244* (2013.01); *B29C 2945/76257* (2013.01)
USPC ............ 425/169; 264/409; 264/478; 425/170

(58) Field of Classification Search
CPC .................... B29C 45/401; B29C 2945/7604; B29C 2945/7611; B29C 2945/76244; B29C 2945/76006; B29C 2945/76257
USPC ................. 425/169, 170, 171, 172, 556, 577; 264/408, 409, 478
See application file for complete search history.

(56) References Cited

U.S. PATENT DOCUMENTS

| 2,217,661 | A | * | 10/1940 | Anderson | 425/351 |
| 2,837,796 | A | * | 6/1958 | Alvino | 249/68 |
| 3,591,898 | A | * | 7/1971 | Stenmo | 425/556 |
| 4,126,291 | A | * | 11/1978 | Gilbert et al. | 249/63 |
| 4,136,566 | A | * | 1/1979 | Christensen | 374/161 |
| 4,515,544 | A | * | 5/1985 | Boehm et al. | 425/129.1 |
| 4,516,864 | A | * | 5/1985 | Kim et al. | 374/130 |
| 4,889,311 | A | * | 12/1989 | Anglin | 249/68 |
| 5,427,516 | A | * | 6/1995 | Bader et al. | 425/149 |
| 5,644,833 | A | * | 7/1997 | Starkey | 29/527.2 |
| 6,345,974 | B1 | * | 2/2002 | Kawasaki et al. | 425/149 |

(Continued)

FOREIGN PATENT DOCUMENTS

JP          2007008086 A  *  1/2007

*Primary Examiner* — Yogendra Gupta
*Assistant Examiner* — Emmanuel S Luk
(74) *Attorney, Agent, or Firm* — Bacon & Thomas, PLLC

(57) ABSTRACT

A pin having a light guide for an injection mold includes an outer sleeve having a hollow portion, an inner sleeve fixed to the hollow portion of the outer sleeve, a bundle sleeve fixed to a hollow portion of the inner sleeve, a bundle fiber fixed to a hollow portion of the bundle sleeve. A leading end portion of the bundle sleeve has a substantially cone-shaped caulked portion. A portion of the hollow portion of the inner sleeve which is brought into contact with the cone-shaped caulked portion of the bundle sleeve has a tapered shape that coincides with the shape of the portion of the bundle sleeve. A shoulder portion is formed at a rear end portion of the hollow portion of the outer sleeve and a rear end of the inner sleeve is engage with the shoulder portion.

9 Claims, 8 Drawing Sheets

(56) References Cited

U.S. PATENT DOCUMENTS

| | | | |
|---|---|---|---|
| 6,379,141 B1* | 4/2002 | Kawasaki et al. | 425/139 |
| 6,752,616 B2* | 6/2004 | Starkey | 425/436 R |
| 6,872,069 B2* | 3/2005 | Starkey | 425/556 |
| 6,929,464 B2* | 8/2005 | Suzuki | 425/556 |
| 7,430,923 B2* | 10/2008 | Bader | 73/856 |
| 7,585,166 B2* | 9/2009 | Buja | 425/143 |
| 8,425,217 B2* | 4/2013 | Groleau | 425/149 |
| 2002/0018825 A1* | 2/2002 | Starkey | 425/444 |
| 2003/0012844 A1* | 1/2003 | Starkey | 425/556 |
| 2004/0142057 A1* | 7/2004 | Kao et al. | 425/149 |
| 2004/0185142 A1* | 9/2004 | Olaru | 425/564 |
| 2005/0242476 A1* | 11/2005 | Homann et al. | 264/572 |
| 2006/0182832 A1* | 8/2006 | Ho | 425/170 |
| 2007/0104823 A1* | 5/2007 | Olaru | 425/564 |
| 2008/0085334 A1* | 4/2008 | Barnett | 425/110 |
| 2008/0223144 A1* | 9/2008 | Bader | 73/756 |
| 2008/0277822 A1* | 11/2008 | Chen et al. | 264/237 |
| 2011/0151041 A1* | 6/2011 | Groleau | 425/139 |

* cited by examiner

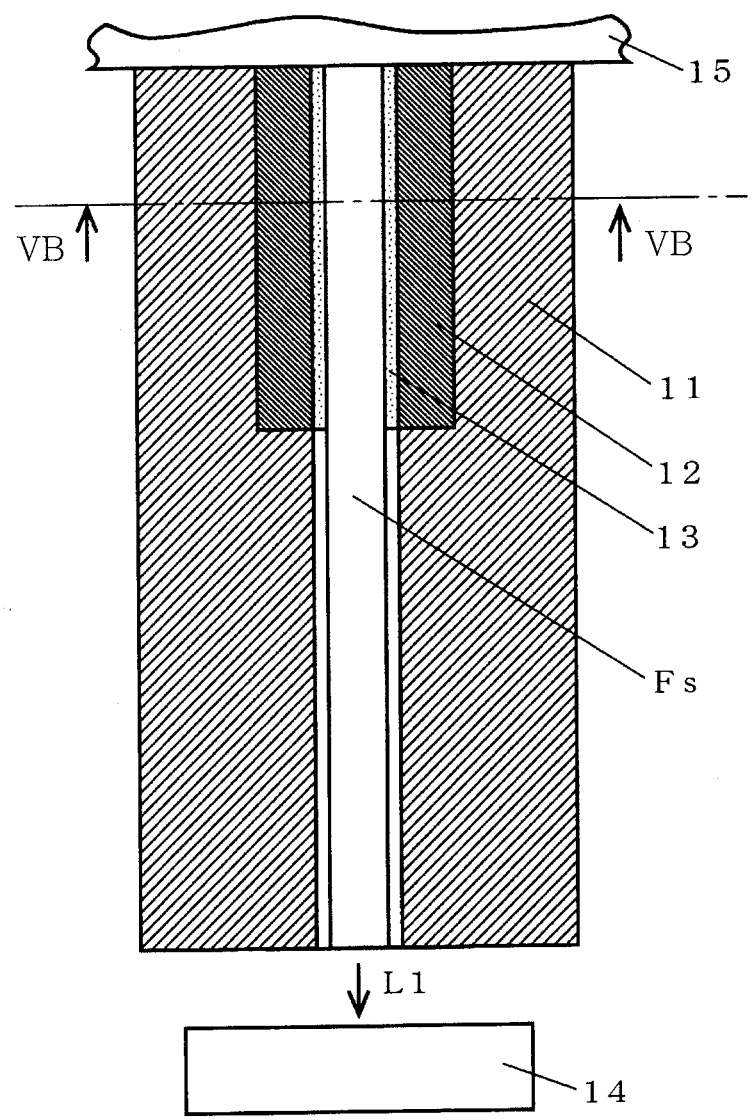

PIN HAVING LIGHT GUIDE FOR INJECTION MOLD

FIELD OF THE INVENTION

The present invention relates to a pin, such as an ejector pin, a core pin or the like, for an injection mold, which has a light guide such as an optical fiber, a bundle fiber or the like installed at the pin.

BACKGROUND OF THE INVENTION

Recently, there is developed an intelligent resin molding which measures temperature, pressure, flow speed and the like of a molten resin in a cavity of an injection mold and controls molding conditions. Further, there is suggested an ejector pin including an optical fiber, installed in a hollow portion of a metal sleeve, for measurement of a temperature of the molten resin in the cavity (see, e.g., Japanese Patent Application Publication No. 2008-14686).

Hereinafter, a conventional ejector pin in which an optical fiber is installed in a metal sleeve will be described with reference to FIGS. 5A and 5B.

FIG. 5A is a cross sectional view taken along a longitudinal direction (axial direction) of an ejector pin (except an optical fiber Fs), and FIG. 5B is a cross sectional view taken along line VB-VB of FIG. 5A.

The ejector pin includes a metal sleeve 11 having a hollow portion extending in the axial direction, and a spacer 12 made of stainless steel is fixed in a part of the hollow portion has a larger inner diameter. An optical fiber Fs of a single line (single strand) is inserted into the hollow portion and fixed to the spacer 12 by heat resistant resin (heat resistant adhesive) 13 such as epoxy resin or the like.

As shown in FIG. 5A, a leading end of the metal sleeve 11 is exposed to a cavity 15 of the injection mold, and the rear end of the metal sleeve 11 is coupled (connected) to a light receiving portion 14. When molten resin is injected into the cavity 15, infrared rays are emitted from the molten resin. The infrared rays are transmitted to the light receiving portion 14 through the optical fiber Fs, as indicated by an arrow L1. The infrared rays transmitted to the light receiving portion 14 are converted into electric signals and used for measuring a temperature of the molten resin.

The ejector pin shown in FIGS. 5A and 5B uses a single line optical fiber. Therefore, in order to measure a flow speed of the molten resin in the cavity 13, two optical fibers for light emission and light reception are required. Further, when the optical fibers for light emission and light reception are each made of a single line, the light emitting/receiving amount transmitted therethrough is small and, thus, it is difficult to transmit a sufficient amount of light which is required to measure the flow speed of the molten resin.

In order to increase the light emitting/receiving amount, a so-called bundle fiber, including a plurality of lines of optical fibers tied together, needs to be used.

Meanwhile, the bundle fiber is formed by binding several optical fibers, so that the surface (outer peripheral surface) thereof is uneven and has an incomplete circular cross section. Therefore, when the bundle fiber is fixed to the hollow portion of the metal sleeve 11 by the heat resistant resin 13 as shown in FIGS. 5A and 5B, a clearance is generated between the bundle fiber and the spacer 12, which makes it difficult to obtain an adhesive (fixing) strength that ensures endurance against the resin pressure in the cavity cannot be obtained.

Accordingly, the present inventor has manufactured, as a trial, a pin having a bundle fiber shown in FIGS. 6A and 6B.

FIG. 6A is a cross sectional view taken along a longitudinal direction (axial direction) of the pin having a bundle fiber (except the bundle fiber Fb), and FIG. 6B is a cross sectional view taken along line VIB-VIB of FIG. 6A.

The pin having the bundle fiber shown in FIGS. 6A and 6B includes an outer metal sleeve (pin sleeve) 21, a metal bundle sleeve 22, and the bundle fiber Fb. The bundle sleeve 22 is fixed to an inner surface of the outer sleeve 21 by a heat resistant resin such as an epoxy resin or the like. Further, the bundle fiber Fb is inserted into the hollow portion of the sleeve 22. The pin having the bundle fiber has a leading end exposed to the cavity 25 and a rear end connected (coupled) to the light emitting/receiving portion 24.

Here, the end of the pin having the bundle fiber which faces the cavity 25 is referred to as "leading end," and the other end (the end facing the light emitting/receiving portion 24) is referred to as "rear end." Further, a portion close to the leading end of the pin having the bundle fiber is referred to as "leading end portion" and a portion close to the rear end is referred to as "rear end portion." This is the same in the following description.

The bundle fiber Fb is manufactured by binding a plurality of optical fibers into a bundle by thermal pressing without using an adhesive, and thus has a high heat resistance.

The bundle fiber Fb is maintained by caulking (firmly tightening) the leading end portion of the bundle sleeve 22 in a cone shape. A substantially cone-shaped caulked portion 221 has a tapered shape that becomes gradually narrower toward the leading end.

The cross sectional shape of the bundle fiber Fb is illustrated as a complete circle, for convenience. However, it is generally not a complete circle and has an uneven surface (outer peripheral surface).

When the leading end portion of the bundle sleeve 22 is caulked, a gap is generated between the caulked portion 221 and the inner surface of the hollow portion of the outer sleeve 21. The gap is filled by the heat resistant resin (heat resistant adhesive) 23 such as epoxy resin or the like. The inclined angle of the caulked portion 221 is set to about 10°.

The light generated from the light emitting portion 241 of the light emitting/receiving portion 24 is transmitted to the cavity 25 through a part of the optical fibers of the bundle fiber Fb and irradiates the molten resin in the cavity 25. The light reflected from the molten resin is transmitted to the light receiving portion 242 of the light emitting/receiving portion 24 through the other optical fibers of the bundle fiber Fb and is converted into an electrical signal. The flow speed of the molten resin in the cavity 25 is measured (calculated) by the electrical signal. Arrows L2 indicate light directed from the light emitting portion 241 toward the bundle fiber Fb and light reflected from the molten resin in the cavity 25 and directed toward the light receiving portion 242 through the bundle fiber Fb.

Since the leading end of the pin having the bundle fiber shown in FIGS. 6A and 6B is exposed to the cavity 25, the heat resistant resin 23 is softened by the heat of the molten resin in the cavity 25 and depressed by the molten resin pressure. Further, the heat resistant resin 23 may be eroded by the gas generated by the molten resin.

SUMMARY OF THE INVENTION

In order to solve the above problems of the pin having a bundle fiber shown in FIGS. 6A and 6B, the present invention provides a pin having a light guide for an injection mold having a structure in which no gap is generated between the caulked portion 221 and the inner surface of the outer sleeve 21, i.e., a structure in which the heat resistant resin 23 is not exposed in the cavity 25.

In accordance with an aspect of the present invention, there is provided a pin having a light guide for an injection mold, including: an outer sleeve having a hollow portion; an inner sleeve fixed to the hollow portion of the outer sleeve; a bundle sleeve fixed to a hollow portion of the inner sleeve; and a bundle fiber fixed to a hollow portion of the bundle sleeve, wherein a leading end portion of the bundle sleeve has a substantially cone-shaped caulked portion, a portion of the hollow portion of the inner sleeve which is brought into contact with the cone-shaped caulked portion of the bundle sleeve has a tapered shape that coincides with the shape of the portion of the bundle sleeve, a shoulder portion is formed at a rear end portion of the hollow portion of the outer sleeve, and a rear end of the inner sleeve is engage with the shoulder portion.

The bundle sleeve may have a bolt portion at a rear end portion thereof. A nut may be engaged with the bolt portion. The nut may be positioned between a rear end of the inner sleeve and the shoulder portion and a part of the nut may be engaged with the shoulder portion.

A heat resistant resin layer may be provided between the rear end of the inner sleeve and the nut.

Uneven portions may be formed at a part of an outer peripheral surface, in an axial direction, of the bundle sleeve and at a part of an inner peripheral surface, in the axial direction, of the inner sleeve and a heat resistant resin layer may be formed between the uneven portions of the bundle sleeve and the inner sleeve.

The uneven portions may have a threaded shape or a ring shape.

In the pin of the present invention, the caulked portion is formed by caulking the leading end portion of the bundle sleeve having the bundle fiber inserted therein in the cone shape, and the leading end portion of the inner sleeve has a tapered shape that coincides with the shape of the caulked portion. Therefore, the heat resistant resin is not exposed at the leading end of the pin having a light guide. Accordingly, the heat resistant resin is not depressed by the pressure of the molten resin in the cavity and is not eroded by the gas generated by the molten resin.

In the pin of the present invention, the bundle sleeve having the bundle fiber inserted therein is fixed to the outer sleeve through the inner sleeve. Therefore, the gap between the sleeves is small, and the molten resin in the cavity does not enter the pin during the molding.

In the pin of the present invention, the shoulder portion is provided at the rear end portion of the outer sleeve, and the rear end of the inner sleeve is engaged with the shoulder portion. Accordingly, the inner sleeve and the bundle sleeve are not moved toward the side opposite to the cavity by the pressure of the molten resin in the cavity.

In the pin of the present invention, the bolt portion is formed at the rear end portion of the bundle sleeve, and the nut is engaged with the bolt portion. A part of the nut is engaged with the shoulder portion of the outer sleeve, so that the inner sleeve and the bundle sleeve are not moved toward the side opposite to the cavity by the pressure of the molten resin in the cavity.

In the pin of the present invention, the uneven portions are formed at the rear end portions of the inner sleeve and the bundle sleeve, and the heat resistant resin layer is formed between the uneven portions. Therefore, the inner sleeve and the bundle sleeve are strongly coupled to each other, and the inner sleeve and the bundle sleeve are not moved toward the side opposite to the cavity by the pressure of the molten resin in the cavity.

BRIEF DESCRIPTION OF THE DRAWINGS

The objects and features of the present invention will become apparent from the following description of embodiments, given in conjunction with the accompanying drawings, in which:

FIGS. 5A and 5B show a structure of a conventional ejector pin in which an optical fiber is installed in a metal sleeve.

DETAILED DESCRIPTION OF THE EMBODIMENTS

Figure 1A:
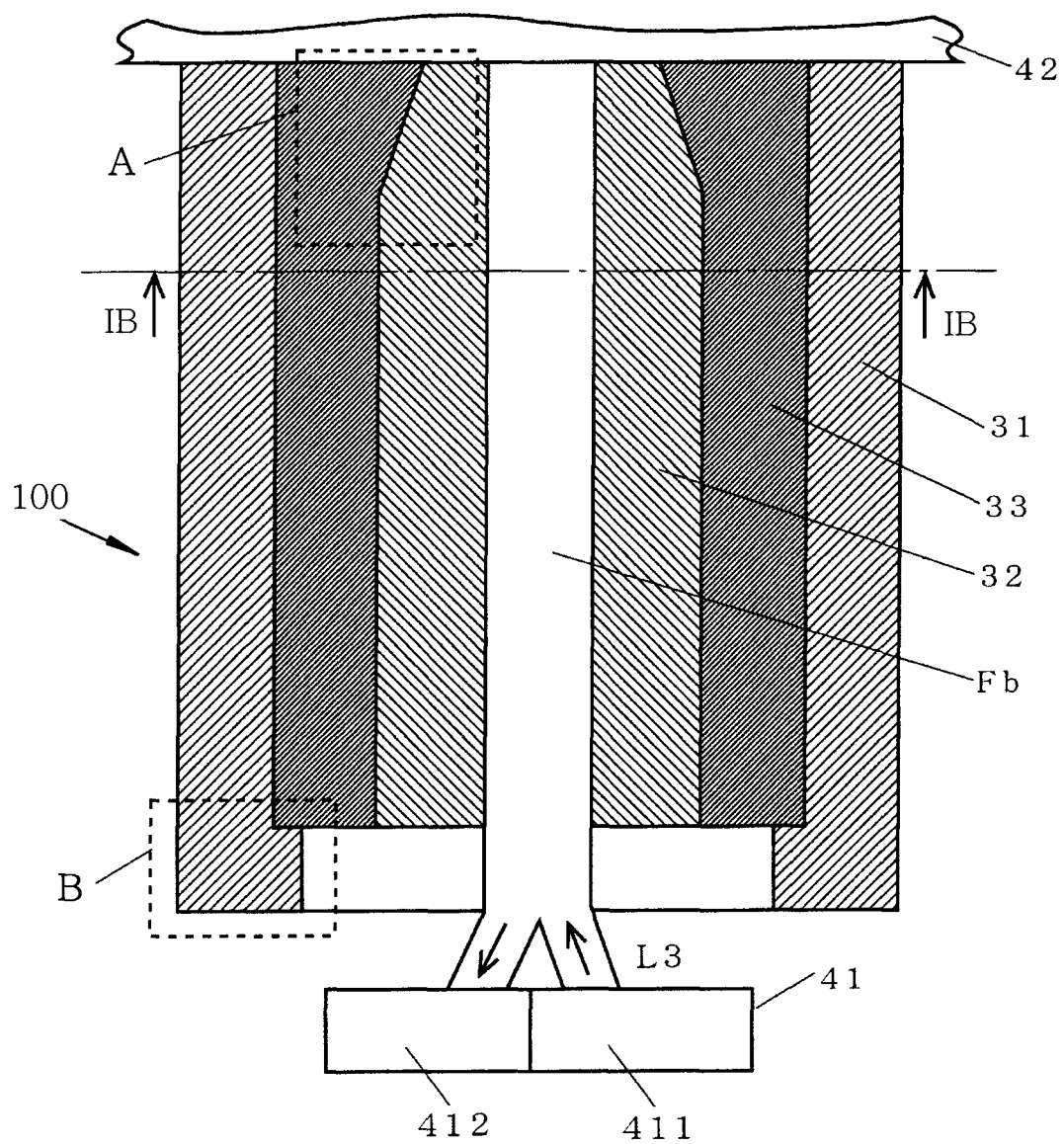
FIGS. 1A to 1D show a structure of a pin having a bundle fiber in accordance with a first embodiment of the present invention.

A pin having a bundle fiber in accordance with an embodiment of the present invention will be described with reference to FIGS. 1A to 4D. Further, like reference numerals refer to like parts in the respective drawings.

First Embodiment

FIGS. 1A to 1D show a structure of a pin 100 having a bundle fiber in accordance with a first embodiment of the present invention and a configuration example in which the pin 100 is used for measuring a flow speed of molten resin in a cavity.

Figure 1B:
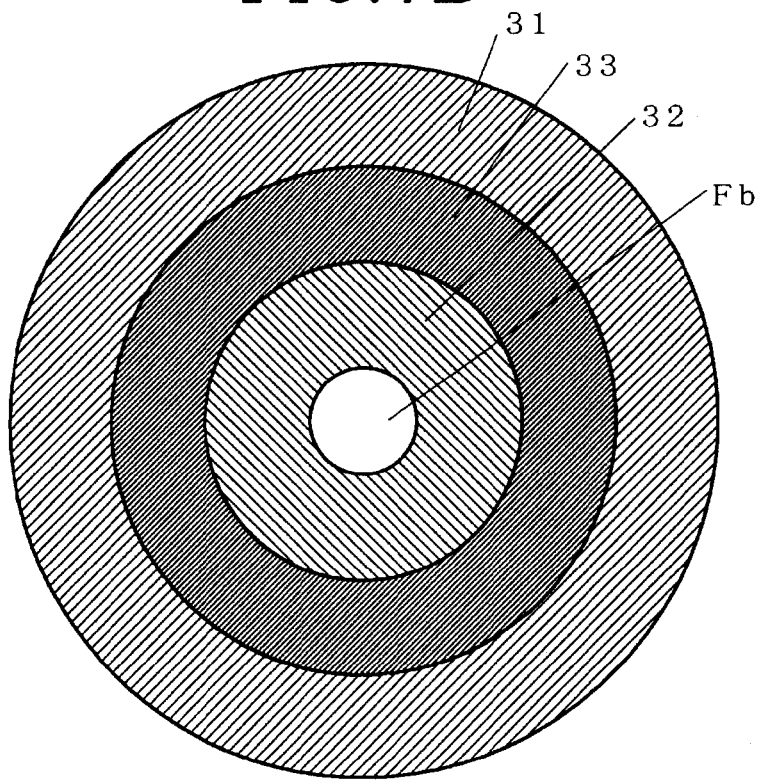
Figure 1C:
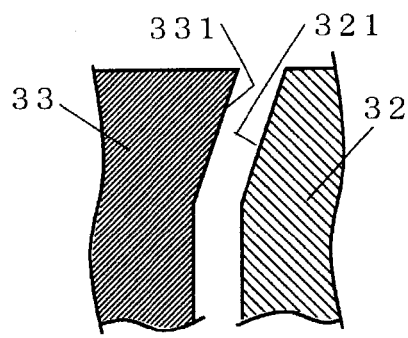
Figure 1D:
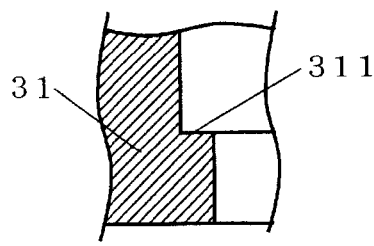

FIG. 1A is a cross sectional view taken along a longitudinal direction (axial direction) of the pin 100 having a bundle fiber Fb (except the bundle fiber Fb). FIG. 1B is a cross sectional view taken along line IB-IB portion shown in FIG. 1A. FIG. 1O is an enlarged view of the "A" portion shown in FIG. 1A. FIG. 1D is an enlarged view of the "B" portion shown in FIG. 1A. In FIG. 1O, the bundle sleeve 32 and the inner sleeve 33 are separated for better understanding of the shape. In FIG. 1D, the inner sleeve 33 is omitted.

Figure 5B:
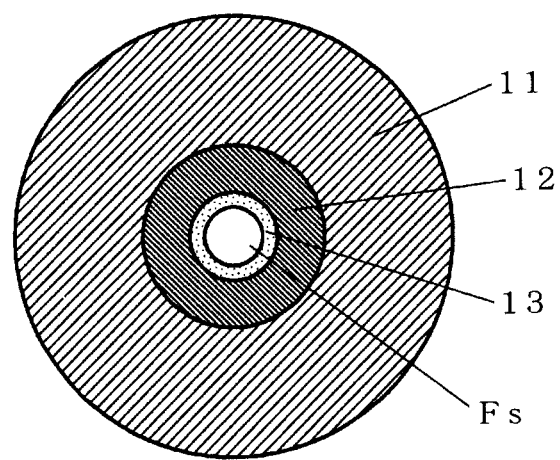
Figure 6A:
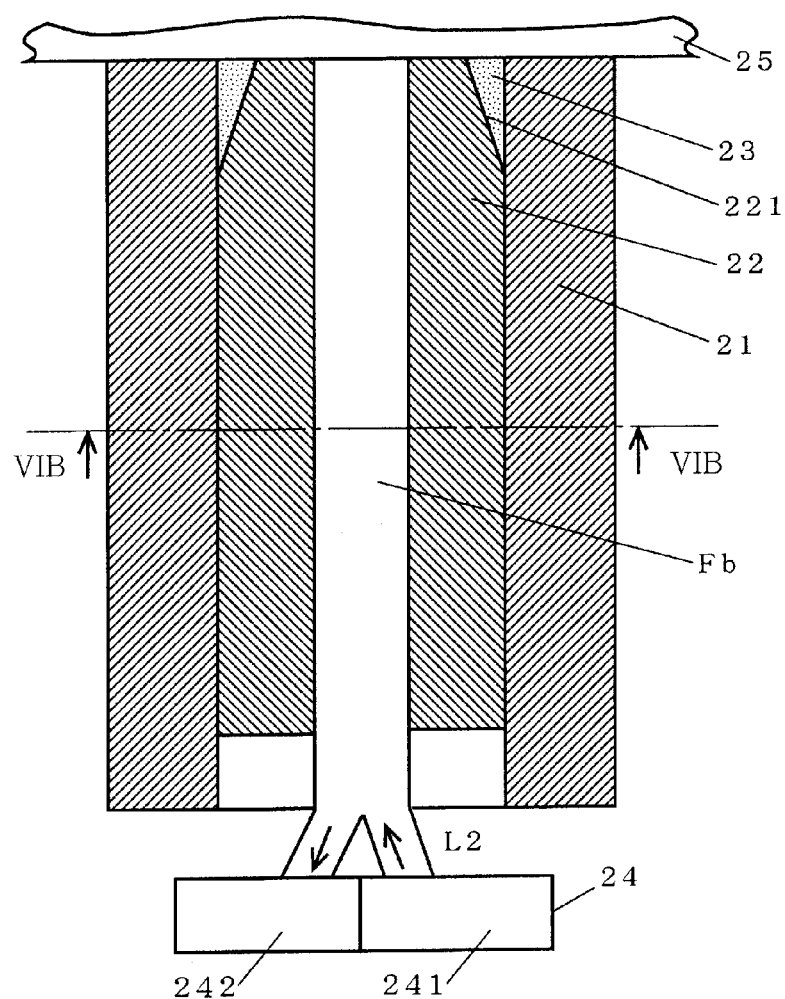
FIGS. 6A and 6B show a structure of another conventional pin having a bundle fiber.
Figure 6B:
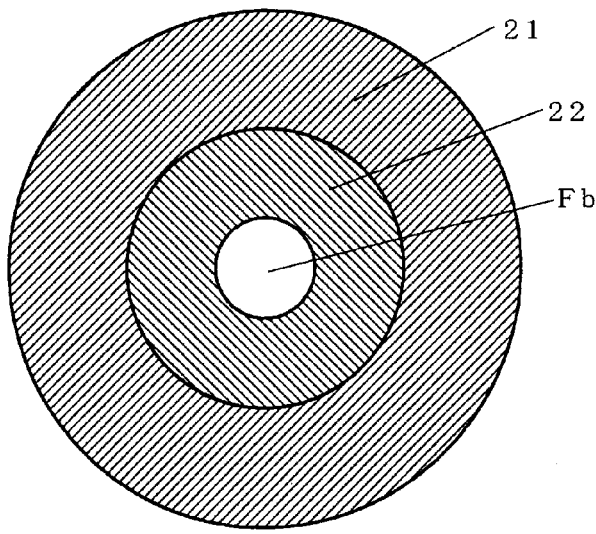

The pin 100 shown in FIG. 1 corresponds to a configuration in which the inner sleeve 33 is added to the pin having a bundle fiber shown in FIG. 5. In other words, the pin 100 of FIG. 1 includes a metal outer sleeve (pin sleeve) 31, a metal bundle sleeve 32, a metal inner sleeve 33, and the bundle fiber Fb. The leading ends of the sleeves and the bundle fiber Fb are arranged on a plane perpendicular to the axis (pin axis) of the outer sleeve 31.

The bundle fiber Fb is inserted into the hollow portion of the bundle sleeve 32. The bundle fiber Fb is maintained by caulking (firmly tightening) the leading end portion of the bundle sleeve 32 in a cone shape. The substantially cone-shaped caulked portion 321 has a tapered shape that becomes gradually narrower toward the leading end. The inner surface shape of the hollow portion of the inner sleeve 33 coincides with the outer peripheral surface shape of the bundle sleeve 32. Therefore, a portion 331 of the inner surface of the inner sleeve 33 which is brought into contact with the caulked portion 321 of the bundle sleeve 32 has a tapered shape same as that of the caulked portion 321, and an inner diameter thereof becomes gradually narrower toward the leading end. Further, the inclined angle of the caulked portion 321 is set to about 10°.

A shoulder portion 311 for maintaining the rear end of the inner sleeve 33 is formed by decreasing the inner diameter of the rear end portion of the hollow portion of the outer sleeve 31 compared to the other portions. The shoulder portion 311 prevents the inner sleeve 33 from moving toward the light emitting/receiving portion 41 by the resin pressure in the cavity 42.

The inner sleeve 33 is press-fitted in the hollow portion of the outer sleeve 31, and the bundle sleeve 32 is press-fitted in the hollow portion of the inner sleeve 33. The sleeves may be fixed by heat resistant resin (heat resistant adhesive) such as epoxy resin or the like, instead of pressing, or may be fixed by both of the pressing and the heat resistant resin. In the case of using the heat resistant resin for fixing the sleeves, a machining accuracy in the inner surfaces and the outer peripheral surfaces of the sleeves may deteriorate compared to the case of fixing the sleeves by pressing.

The light generated by the light emitting portion 411 of the light emitting/receiving portion 41 is transmitted to the cavity 42 through a part of the optical fibers of the bundle fiber Fb and irradiates the molten resin in the cavity 42. The light reflected from the molten resin is transmitted to the light receiving portion 412 of the light emitting/receiving portion 41 through the other optical fibers of the bundle fiber Fb and converted into an electrical signal. The flow speed of the molten resin in the cavity 42 is measured (calculated) by the electrical signal. Arrows L3 indicate light directed from the light emitting portion 411 toward the bundle fiber Fb and light reflected from the molten resin in the cavity and directed toward the light receiving portion 412 through the bundle fiber Fb.

In the present embodiment, a plurality of optical fibers forming the bundle fiber Fb is divided into two parts for transmission and reception to measure the flow speed of the molten resin in the cavity 42. However, the bundle fiber may be applied to, instead of measurement of the flow speed, measurement of a temperature or a pressure of the molten resin, measurement of existence or non-existence of the molten resin in the cavity 42, or the like. The bundle fiber Fb may also be used as a unidirectional light transmitting device.

Hereinafter, the manufacturing process of the pin 100 having the bundle fiber in accordance with the first embodiment will be described with reference to FIGS. 4A to 4D.

First, the shoulder portion 311 is formed by boring the leading end of the inner surface of the outer sleeve 31 (not shown).

Figure 4A:
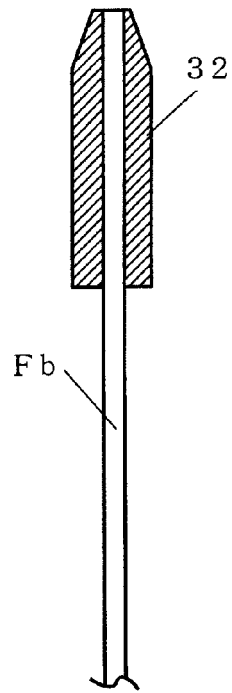
FIGS. 4A to 4D explain a manufacturing process of the pin having the bundle fiber in accordance with the first embodiment of the present invention.

Next, the bundle fiber Fb is inserted into the bundle sleeve 32, and the leading end portion thereof is caulked (FIG. 4A).

Figure 4B:
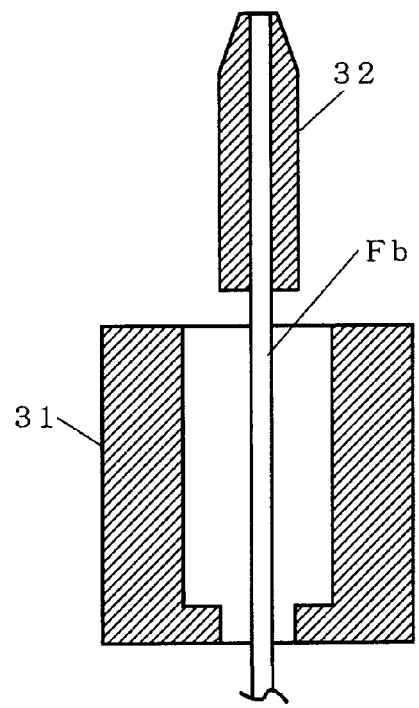

Then, the bundle sleeve 32 shown in FIG. 4A is inserted into the outer sleeve 31 from the rear end side of the outer sleeve 31 to protrude outward beyond the leading end of the outer sleeve 31 (FIG. 4B).

Figure 4C:
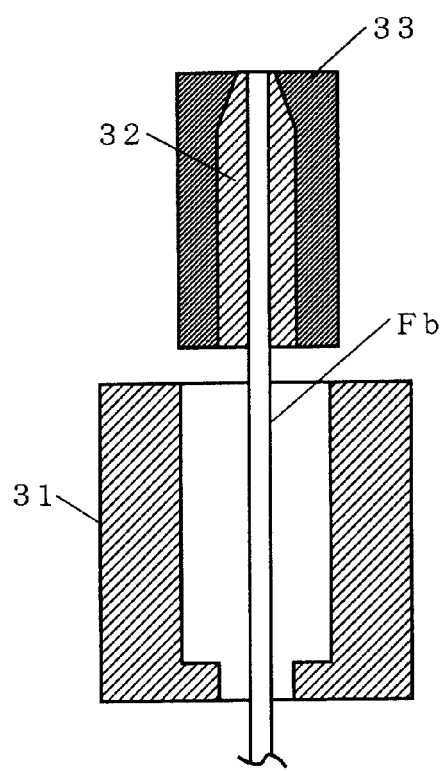

Thereafter, the bundle sleeve 32 is inserted into the inner sleeve 33 and fixed to the inner sleeve 33 by the heat resistant adhesive (FIG. 4C).

Figure 4D:
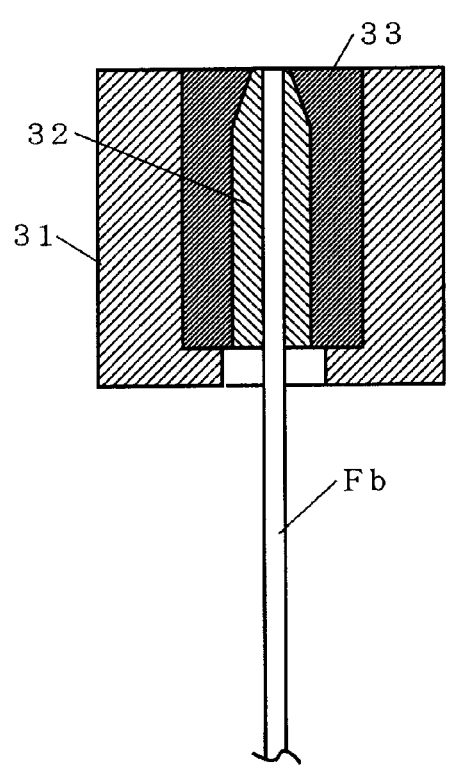

Next, the inner sleeve 33 to which the bundle sleeve 32 is fixed is inserted into the outer sleeve 31 and fixed to the outer sleeve 31 by a heat resistant adhesive (FIG. 4D).

Lastly, in the state shown in FIG. 4D, the leading ends of the outer sleeve 31, the inner sleeve 33, the bundle sleeve 32 and the bundle fiber Fb are polished so as to be positioned on the same plane.

Second Embodiment

Figure 2:
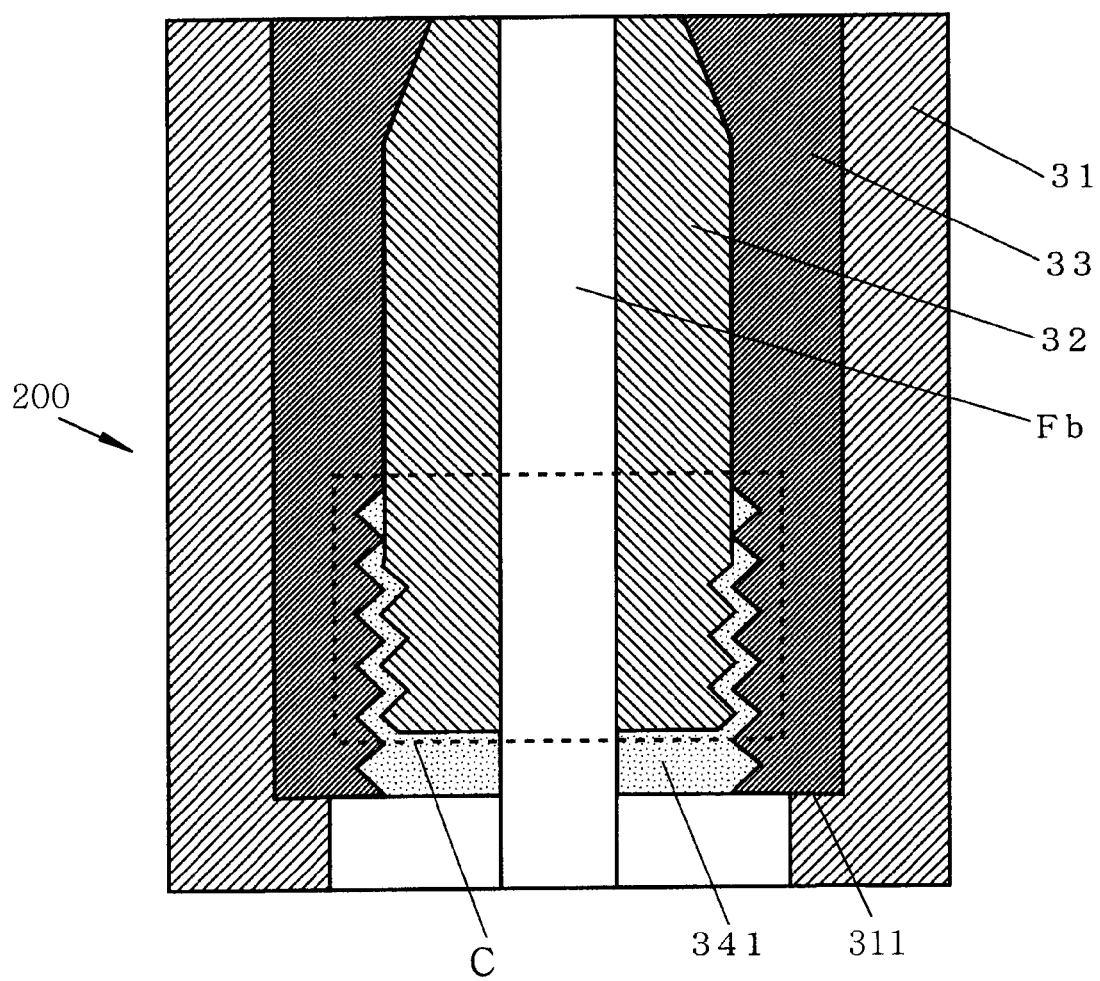
FIG. 2 shows a structure of a pin having a bundle fiber in accordance with a second embodiment of the present invention.

FIG. 2 shows a structure of a pin 200 having a bundle fiber in accordance with a second embodiment of the present invention.

The pin 200 having the bundle fiber shown in FIG. 2 is different from the pin 100 having the bundle fiber shown in FIGS. 1A to 1D in that the heat resistant resin layer 341 is provided. The other portions are the same as those of the pin 100 having the bundle fiber shown in FIGS. 1A to 1D.

In FIG. 2, the light emitting/receiving portion 41 and the cavity 42 in FIGS. 1A to 1D are omitted.

A threaded or a ring shaped uneven portion "C" is formed at a part of the outer peripheral surface in the axial direction, of the bundle sleeve 32 and a part of the inner peripheral surface, in the axial direction, of the inner sleeve 33. A heat resistant resin is filled between the outer peripheral surface of the bundle sleeve 32 and the inner peripheral surface of the inner sleeve 33 and, also, a heat resistant resin layer 341 is formed so that the rear end of the bundle sleeve 32 is covered with the heat resistant resin. The heat resistant resin at the rear end of the bundle sleeve 32 may be omitted or may be provided if necessary. Moreover, the uneven portion "C" may be extended toward the leading ends of the inner sleeve 33 and the bundle sleeve 32 so as to cover a wider range than that illustrated in the drawing. The range of the uneven portion "C" may be set in consideration of a required coupling strength.

The bundle sleeve 32 is coupled to the inner sleeve 33 by the uneven portion "C" and the heat resistant resin layer 341, and the rear end of the inner sleeve 33 is engaged with the shoulder portion 311 of the outer sleeve 31. Therefore, the bundle sleeve 32 and the inner sleeve 33 are prevented from being moved toward the light emitting/receiving portion by the pressure of the molten resin in the cavity. Further, the uneven portion "C" may be a rough surface portion instead of the threaded or ring-shaped uneven surface.

Third Embodiment

Figure 3:
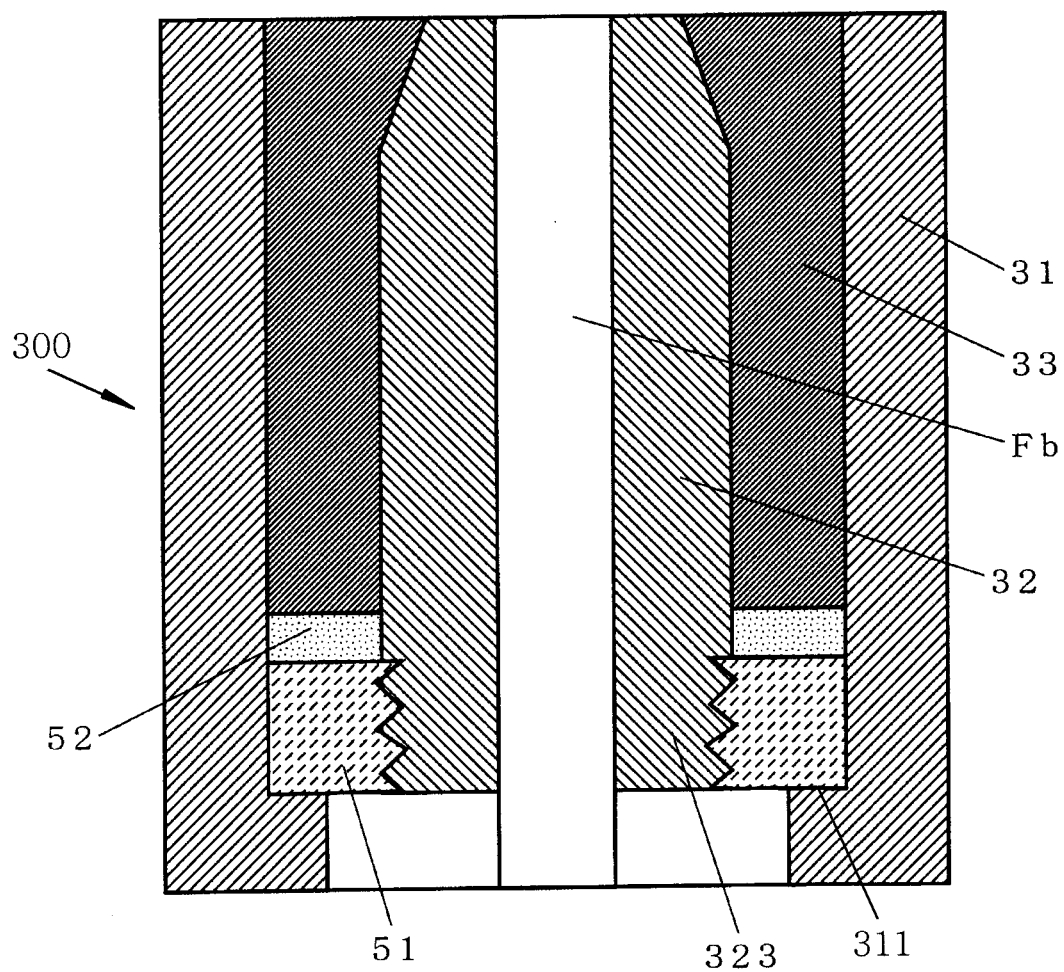
FIG. 3 shows a structure of a pin having a bundle fiber in accordance with a third embodiment of the present invention.

FIG. 3 shows a structure of a pin 300 having a bundle fiber in accordance with a third embodiment of the present invention.

The pin 300 having a bundle fiber of FIG. 3 is different from the pin 100 having a bundle fiber of FIG. 1 in that a bolt portion 323 and a nut 51 are provided. The other portions are the same as those of the pin 100 having a bundle fiber of FIG. 1.

The bolt portion 323 is formed by screw-machining the outer peripheral surface of the rear end portion of the bundle sleeve 32, and the nut 51 is engaged with the bolt portion 323. Further, a part of the nut 51 is engaged with the shoulder portion 311 of the outer sleeve 31. A heat resistant resin layer 52 is provided between the rear end of the inner sleeve 33 and the nut 51. The rear end of the inner sleeve 33 may be in direct contact with the nut 51 without providing the heat resistant resin layer 52. However, an axial length error of the inner sleeve 33 may be absorbed by providing the heat resistant resin layer 52.

The bundle sleeve 32 is engaged with the shoulder portion of the outer sleeve 31 through the nut 51 engaged with the bolt portion 323, and thus is prevented from being moved toward the light emitting/receiving portion by the pressure of the molten resin in the cavity.

While the invention has been shown and described with respect to the embodiments, it will be understood by those skilled in the art that various changes and modification may be made without departing from the scope of the invention as defined in the following claims.

What is claimed is:

1. A pin having a light guide for an injection mold, comprising:
    an outer sleeve having a hollow portion;
    an inner sleeve fixed to the hollow portion of the outer sleeve;
    a bundle sleeve fixed to a hollow portion of the inner sleeve; and
    a bundle fiber fixed to a hollow portion of the bundle sleeve,
    wherein a leading end portion of the bundle sleeve has a substantially cone-shaped caulked portion,
    a portion of the hollow portion of the inner sleeve which is brought into contact with the cone-shaped caulked portion of the bundle sleeve has a tapered shape that coincides with the shape of the portion of the bundle sleeve,
    a shoulder portion is formed at a rear end portion of the hollow portion of the outer sleeve,
    a rear end of the inner sleeve is engaged with the shoulder portion, and
    leading ends of the outer sleeve, the inner sleeve, the bundle sleeve and the bundle fiber are substantially arranged on a same plane.

2. The pin of claim 1, wherein the bundle sleeve has a bolt portion at a rear end portion thereof;
    a nut is engaged with the bolt portion;
    the nut is positioned between a rear end of the inner sleeve and the shoulder portion; and
    a part of the nut is engaged with the shoulder portion.

3. The pin of claim 2, wherein a heat resistant resin layer is provided between the rear end of the inner sleeve and the nut.

4. The pin of claim 1, wherein uneven portions are formed at a part of an outer peripheral surface, in an axial direction, of the bundle sleeve and at a part of an inner peripheral surface, in the axial direction, of the inner sleeve; and a heat resistant resin layer is formed between the uneven portions of the bundle sleeve and the inner sleeve.

5. The pin of claim 4, wherein the uneven portions have a threaded shape or a ring shape.

6. The pin of claim 1, wherein the inner sleeve is press-fitted in the outer sleeve, and the bundle sleeve is press-fitted in the inner sleeve, both without using a heat resistant resin.

7. The pin of claim 1, wherein the inner sleeve and the outer sleeve are fixed to each other by using a heat resistant resin or by using both of press-fitting and the heat resistant resin, and the bundle sleeve and the inner sleeve are fixed to each other by using a heat resistant resin or by using both of the press-fitting and the heat resistant resin.

8. The pin of claim 1, wherein the same plane is perpendicular to a pin axis of the outer sleeve.

9. The pin of claim 4, wherein the heat resistant resin layer extends to cover a rear end of the bundle sleeve.

* * * * *